United States Patent [19]

Nuspl

[11] Patent Number: 5,351,655
[45] Date of Patent: Oct. 4, 1994

[54] ACOUSTIC EMISSION SIGNAL COLLECTOR MANIFOLD

[75] Inventor: Steven P. Nuspl, Barberton, Ohio

[73] Assignee: The Babcock & Wilcox Company, New Orleans, La.

[21] Appl. No.: 183,020

[22] Filed: Jan. 18, 1994

[51] Int. Cl.$^5$ .............................. F22B 37/42
[52] U.S. Cl. .................. 122/504; 73/40.5 A
[58] Field of Search .............. 122/504, 504.2; 73/40.5 A, 49.1; 431/16

[56] References Cited

U.S. PATENT DOCUMENTS

| | | | |
|---|---|---|---|
| 2,008,934 | 7/1935 | Smith | 73/40.5 A |
| 3,831,561 | 8/1974 | Yamamoto et al. | 122/504 X |
| 4,502,322 | 3/1985 | Tero | 122/504 X |
| 4,696,191 | 9/1987 | Claytor et al. | 73/600 |
| 4,960,079 | 10/1990 | Marziale et al. | 122/504.2 |
| 4,979,820 | 12/1990 | Shakkottai et al. | 356/129 |
| 4,980,674 | 12/1990 | Scheibel et al. | 340/603 |
| 5,101,774 | 4/1992 | Marziale et al. | 122/504.2 |
| 5,134,876 | 8/1992 | Robertson et al. | 73/40.5 A |

Primary Examiner—Edward G. Favors
Attorney, Agent, or Firm—Daniel S. Kalka; Robert J. Edwards

[57] ABSTRACT

An acoustic emission signal collector for monitoring leaks in furnace wall tubes employs a plurality of waveguides attached to the tubes and connected to a cross member. An acoustic emission sensor positioned on the cross member detects leaks which are propagated from the furnace wall tube to the cross member. An alternate embodiment includes tines or waveguides bent at an angle and attached to the furnace wall tubes.

11 Claims, 5 Drawing Sheets

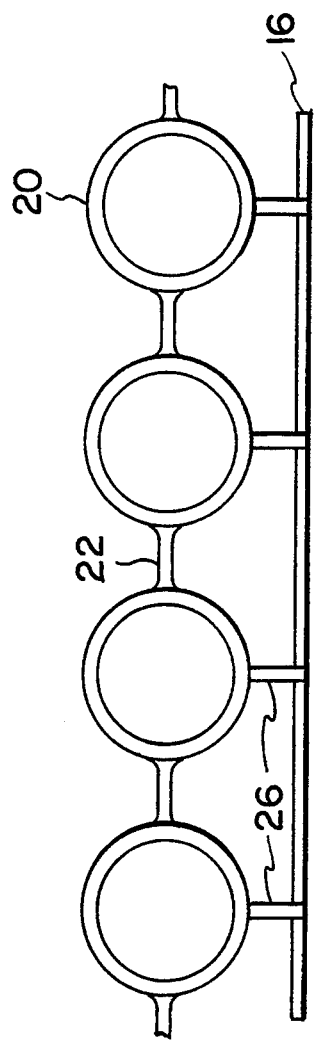
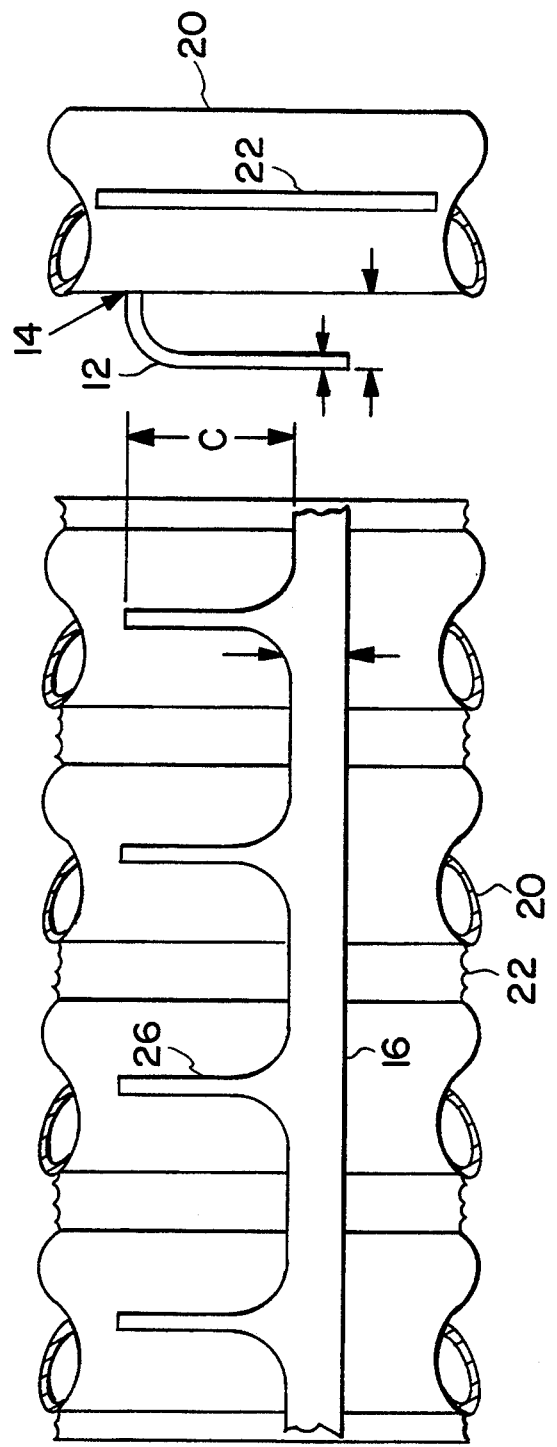

ACOUSTIC EMISSION SIGNAL COLLECTOR MANIFOLD

BACKGROUND OF THE INVENTION

The present invention relates in general to an acoustic emission signal detection technique, and more particularly to an acoustic emission signal collector for leak detection in membrane furnace wall tubes containing a fluid such as water or steam under high pressure. The present invention would also find application for any parallel arrangement of tubes not physically joined by membrane bars but which lie in the same plane.

DESCRIPTION OF THE RELATED ART

Tube leaks in utility boilers firing conventional fuels are primarily economic concerns because early detection minimizes secondary damage and permits an orderly shutdown. If an immediate shutdown is not possible, a leak detection system provides an on-line indication of the leak's progress to determine if boiler operation can continue for several hours until peak demands are met.

Tube leaks in a process recovery (PR) boiler are major safety concerns because introduction of even small amounts of water from the stream to the sodium rich smelt bed on the furnace floor can have catastrophic consequences. Smelt water reactions are very violent which lead to explosion causing extensive equipment damage, personnel injury, and in extreme cases loss of life.

Since the early 1980s, airborne leak detection systems have been successfully used in utility boilers in the domestic market. These systems rely on propagation of acoustic waves through the gaseous medium between the leak and face of an acoustic pressure sensor. Several sensors are typically used for a given installation. They are attached to available observation and personnel access doors using waveguides fabricated from one inch inside diameter (ID) pipe bent to form a long radius elbow.

Most early installations relied on plant operating personnel to inspect and keep ports and waveguides clean to maintain system sensitivity. Ball valves on waveguides, or port doors, were opened momentarily so furnace draft could clear the opening. More recently, airborne systems have been installed with automatic purging which works fairly well when ash remains loose and powdery. In more severe cases, the ash sinters and becomes crusty making it more difficult to remove with the methods just described.

When a tube leak occurs, both air-and structure-borne acoustic energy are produced. Airborne leak detections systems have been used for monitoring since the early 1980s in the U.S. and mid-70s in Europe. This technology is also being applied to limited areas in chemical process recovery, or PR boilers used in the paper making industry. Structure-borne systems have been limited to pipeline and feedwater heater applications. As used for this application, the term airborne acoustic signals are those that propagate through the boiler combustion gases, and structure-borne signals are referred to as acoustic emission or AE-signals.

U.S. Pat. No. 5,134,876 describes an acoustic emission leak simulator for calibrating and/or characterizing current acoustic emission leak detection systems for verification of their integrity.

U.S. Pat. Nos. 4,960,079 and 5,101,774 describe an acoustic leak detection system for a paper pulp mill chemical recovery boiler.

U.S. Pat. No. 4,696,191 is directed to detecting voids or particulates in a fluid by measuring the attenuation and doppler shift of a diffuse ultrasonic sound field passed through the fluid containing the voids.

U.S. Pat. No. 4,980,674 relates to an acoustic ash deposition monitor apparatus and method.

Timely detection of leaks in most conventional boiler installations results in significant cost savings through minimization of secondary damage and by eliminating emergency shutdowns and replacement of lost generating capacity. Because of the potential for significant property damage and personnel injury in PR boilers, early leak detection is a safety as well as an economic concern. Structure-borne, acoustic emission monitoring has the potential for overcoming the many problems encountered with airborne systems which cannot be made to operate reliably in the most critical area of a PR boiler, i.e., the lower furnace.

SUMMARY OF THE INVENTION

The present invention solves the aforementioned problems with the prior art as well as others by providing an acoustic emission signal collector which employs a cross member connected to a plurality of waveguides that are attached to an object to be tested. An acoustic emission signal propagates along a waveguide to the cross member where it is detected with an acoustic emission sensor. Advantageously, the cross member provides a more uniform geometry between the signal source and sensor, so less signal loss occurs. The preferred embodiment includes furnace wall tubes being monitored with the plurality of waveguides connected to the cross member.

Accordingly, one object of the present invention is directed to an acoustic emission signal collector.

Another object of the present invention is directed to an acoustic emission sensor for simultaneously monitoring a plurality of furnace wall tubes, or other arrangements of parallel tubes for leaks.

Still another object of the present invention is to provide an acoustic emission signal collector which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 6 is an elevated perspective view with portions removed of still another embodiment of the present invention;

FIG. 7 is a horizontal sectional view of FIG. 6; and

FIG. 8 is a vertical sectional view of FIG. 6.

DESCRIPTION OF THE PREFERRED EMBODIMENTS

Structure-borne signals typically range from 50 KHz to as high as 500 KHz with frequencies of greatest interest for leak detection in the 100–300 KHz range. These signals are generally assumed to have a 6 dB per doubling of distance attenuation curve through a uniform structure of homogenous materials. Weldment type structures have numerous discontinuities causing AE-signals to have much higher and unpredictable losses. Because of this, structure-borne leak detection systems have not been generally applied to boilers although they are routinely used for feedwater heater and pipeline monitoring. For PR boilers, there appears to be no other practical alternative for monitoring the critical lower furnace area.

Reliable and long term airborne leak detection in the lower furnace of a PR boiler is very difficult because smelt drains down the walls and plugs the port which is difficult to clean due to the chewing gum to concrete-like consistency of this smelt as it cools.

Figure 1:
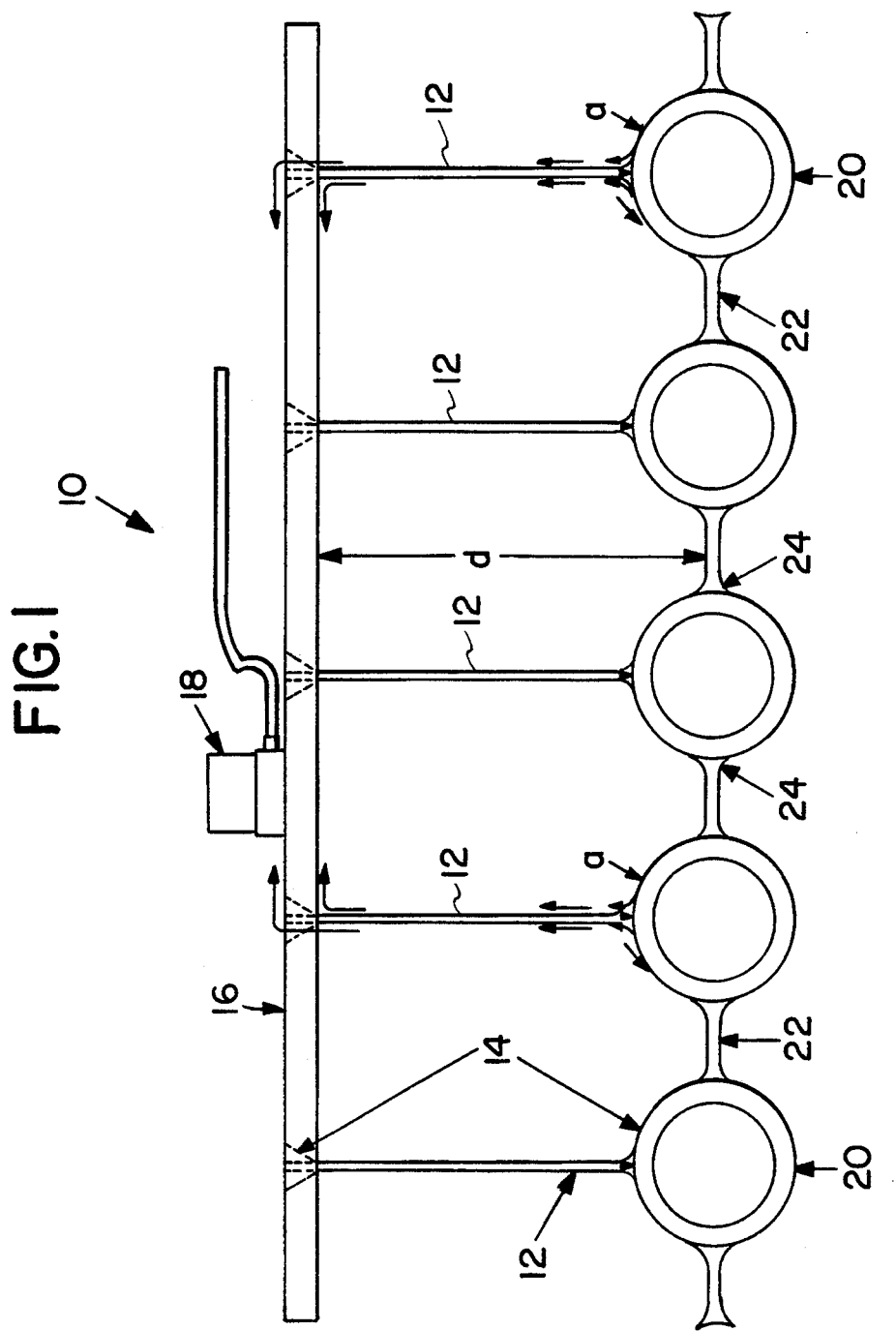
FIG. 1 is a sectional schematic view of one embodiment of the present invention positioned on a furnace membrane panel.

Referring to the Figures where like numerals designate like or similar features throughout the several views, and in particular to FIG. 1, there is shown a schematic view of one embodiment generally depicted 10 according to the present invention. The acoustic emission sensor 10 employs several acoustic emission signal wave guides s 12 attached, for example by welds 14, to a common cross member 16. An acoustic emission sensor 18 is positioned on the cross member 16 for monitoring several furnace wall tubes 20 simultaneously for leaks. As is known in the boiler art, furnace wall tubes 20 are connected to form a membrane panel with membrane bars 22. The membrane bars 22 are attached to the furnace wall tubes 20, for example by continuous welds 24. These water-cooled tubes and membrane bars are shop fabricated in varying panel widths which are used to construct walls ranging in width from 30–40 feet. One wall is often comprised of a hundred or more furnace wall tubes 20.

When a pressurized fluid such as water or steam escapes through a small hole in one of the furnace wall tubes, an acoustic emission signal is generated through interaction of the escaping fluid and hole boundary. The signal shown as arrow A in FIG. 1 travels along the surface of a tube and then along the surface of the attached waveguide 12 into the cross member 16 where it is detected by the acoustic emission sensor 18 which is connected to signal processing controls and displays known in this art (not shown).

Because the cross member 16 has a more uniform geometry than interconnections between the tubes 20, less signal loss occurs which allows many more tubes to be monitored with one sensor than using one or more waveguides attached to a corresponding number of tubes each of which would require a sensor.

Acoustic emission signal wavelengths are quite short (on the order of fractions of an inch) which lead to significant signal losses in the presence of sharp discontinuities and welded joints. Although these signals can travel relatively long distances along a single tube, they are greatly attenuated and travel shorter distances from tube to tube via the membrane wall configuration. For a structure-borne leak detection system to be practical, this system must transfer the signal from the leak site to the sensor with minimum of signal loss. Otherwise, maximum horizontal sensor spacing would be limited to separation distances of only a few tubes.

The present invention overcomes the structure-borne signal losses incurred through membrane construction of furnace walls. Advantageously, the present invention may also be used for non-membrane wall configurations or other similar geometries. Tests on a used furnace wall panel have shown that a sensor can detect a leak signal with nearly equal sensitivity in both the longitudinal and tranverse directions, i.e. longitudinal meaning along the tube axis and tranverse meaning across the tube axis. A single acoustic emission waveguide 12 mounted on one tube showed 12 times more sensitivity in the longitudinal direction then it did in the tranverse direction. Consequently, it would take many more sensors to monitor a given wall area with single waveguides than it would for manifolded ones.

Figure 2:
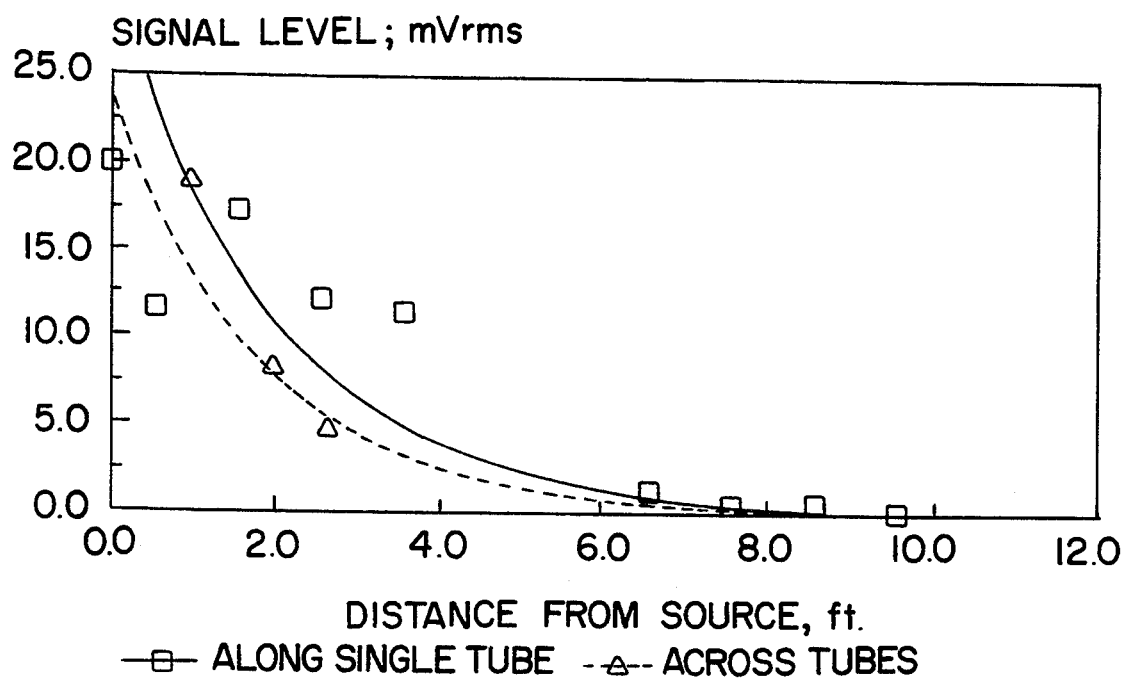
FIG. 2 is a graph showing the longitudinal and transverse sensitivity (attenuation) for an AE-signal collector according to the present invention.

FIG. 2 graphically shows longitudinal and tranverse sensitivity or attenuation for an acoustic emission manifold in accordance with the present invention. Compressed nitrogen at 160 psig was emitted through a ¼ inch orifice. FIG. 2 presents the data for a longitudinal and tranverse attenuation profile obtained for a single tube as well as several tubes.

Figure 3:
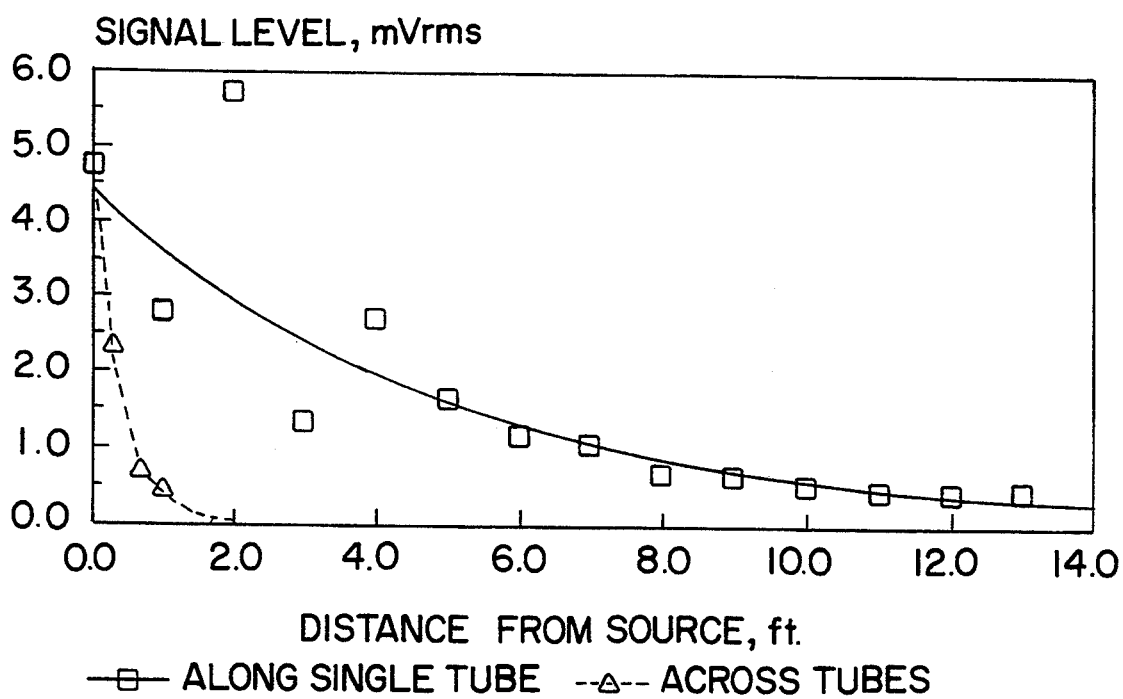
FIG. 3 is a graph showing the sensitivity (attenuation) for a single AE waveguide on a tube.

FIG. 3 shows the sensitivity (attenuation) for a single acoustic waveguide on a tube having a simulated leak using compressed air at 60 psig through a ¼ inch hole.

Returning to FIG. 1, the waveguides include a ¼ inch diameter stainless steel or metal rod such as 304 stainless steel attached with full penetration welds 14 to a cross member 16 which is also made of a metal like 304 stainless steel. The distance d from the cross member 16 to the membrane bars 22 is adjustable to suit the application. In the embodiment tested, the length of the waveguide was approximately 12 inches. Of course, one readily knows that these waveguides 12 and the cross member 16 may be made from any material that allows an emission signal to propagate along it and through the cross member to the acoustic emission sensor 18. Furthermore, it is apparent that while one acoustic emission sensor 18 is shows, one could employ a plurality of these sensors 18 at predetermined distances along the cross member 16.

Figure 4:
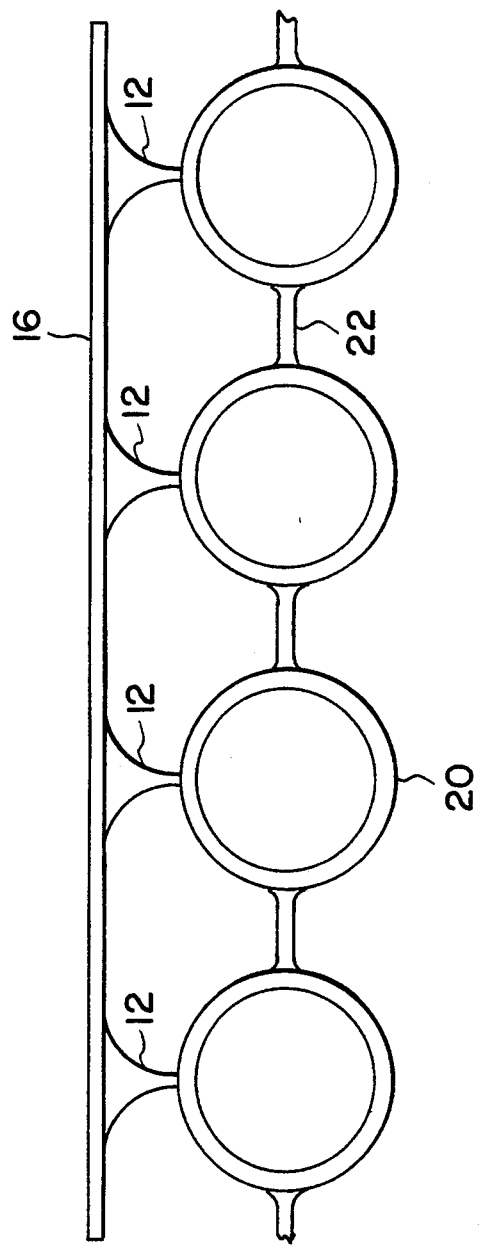
FIG. 4 is a sectional schematic view of an alternate embodiment of the present invention.
Figure 5:
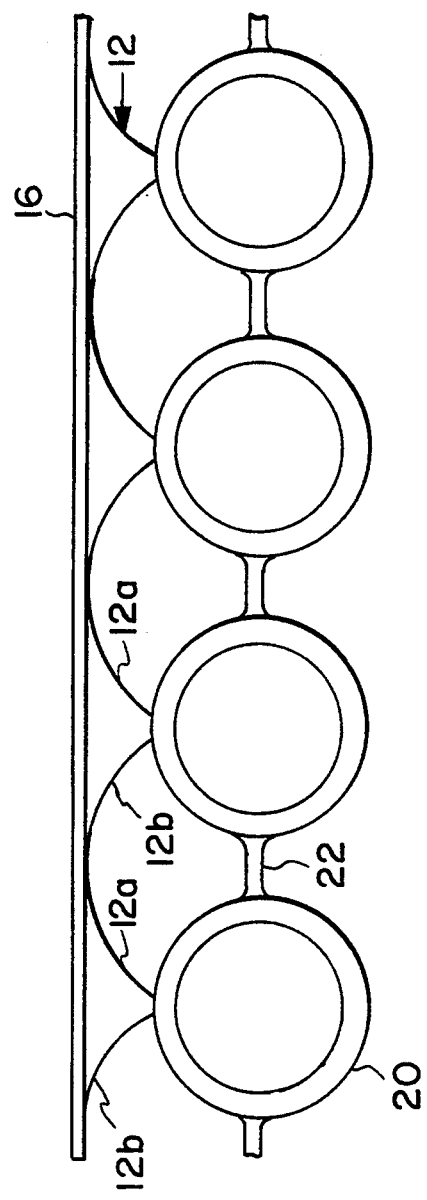
FIG. 5 is a view similar to FIG. 4 of another embodiment of the present invention.

Next referring to FIGS. 4 and 5, there are shown alternate embodiments of the present invention. In these designs, the acoustic emission signal collector may be fabricated from standard structural steel shapes having a T-cross section. The advantage of this design is that only one weld per tube is required. FIG. 4 depicts the acoustic emission signal collector with a short radius design while FIG. 5 depicts another embodiment with a long radius design. As seen in the Figures, each waveguide 12 includes a curved portion (12a, 12 b) on each side which taper at the end connected to the furnace wall tube 20. The other end expands defining the radius of curvature on each side (12a, 12b) with the expanded portion being integral with or attached to cross member 16. The design shown in FIGS. 4 and 5 is less expensive to fabricate due to fewer machining operations.

Next, referring to FIGS. 6 through 8, there is depicted still another embodiment which provides for an acoustic emission signal collector which is not as still as a T-bar shaped collector. In the embodiment shown in FIGS. 6 through 8, the acoustic emission signal collector is formed from a plate that is punched out with equally spaced notches along the strip's length 16 to form tines 26. These tines 26 are bent at a predetermined angle, such as a 90° angle with a one inch radius having a length of about three inches, and attached to the furnace wall tube 20, for example by a weld 14. Ordinarily this would be a full penetration weld similar to those in FIG. 1. While the tines 26 may be individually created and bent; in a production design, several tines could be created and bent at once. The radius of curvature should be large enough to allow signal propagation with the minimum of loss. Also, while the three inch length C is shown for illustrative purposes, this length may be varied as necessary with the radius also being variable.

The advantages of the embodiment shown in FIGS. 6 through 8 provide for less restraint and in-plane thermal expansion of furnace wall tubes. Also, there is less restraint for lateral motion (out of wall plane), and initial installation. A stiff construction would not be as able to accommodate small variations in wall straightness. Also, localized stresses due to thermal expansion and/or out-of-plane vibration are potential sites for tube failures.

The structure-borne leak detection system according to the present invention effectively monitors large areas with a minimum number of sensors and has the following advantages. Hardware can be installed in the most critical areas of the furnace. This is especially important in PR boilers where small tube leaks can be catastrophic due to the violent smelt water reaction that can occur at the lower furnace. The present invention does not rely on port openings into the furnace envelope so bent tube wall openings are not required. This reduces the hardware and installation labor costs. There are no pressure part cuts and welds required which makes system installation less complicated and costly. Hardware installation work can be performed outside the boiler and can generally be done without the need for extensive scaffolding. Also, the present invention works for non-membrane tube configurations. Since no ports are required for the present invention, the structure-borne leak detection system does not require air purging and mechanical rodding. Because of the severe operating environment in PR boilers, leak detection using airborne acoustic signals is unreliable in the most critical area of the boiler. The structure-borne leak detection system of the present invention is relatively immune to combustion and soot blower noise. This is especially important in PR boilers where soot blowers are in almost constant use, i.e., typically in service from five to six minutes, and out of service for 20–30 seconds. Advantageously, structure-borne signal monitoring system of the present invention can also be used for under-bed leak detection which is an extremely critical area that cannot be monitored otherwise.

The present invention is highly adaptable in that a reasonable number of acoustic emission sensors may be used to overcome problems with signal propagation through the cross member bar and tube interfaces. Boiler size, background acoustic emission noise, and smallest detectable leak size are factors which determine the number of acoustic emission system sensors required. Without some method for improving detection range and minimizing signal losses in all directions to maximize coverage per sensor, 30–40 sensors might be required for a small boiler.

While the specific embodiments of the present invention have been shown and described in detail to illustrate the application and principles of the invention, certain modifications and improvements will occur to those skilled in the art upon reading the foregoing description. It is thus understood that all such modifications and improvements have been deleted herein for the sake of conciseness and readability but are properly within the scope of the following claims.

I claim:

1. An acoustic emission signal collector, comprising:
   a plurality of waveguides attached to an object to be tested at a plurality of locations thereon; and
   a cross member connected to said plurality of waveguides.

2. An acoustic emission signal collector as recited in claim 1, wherein the object to be tested includes a furnace wall tube membrane panel.

3. An acoustic emission signal collector as recited in claim 2, wherein said plurality of waveguides include a plurality of rods with one end of each rod being welded to one furnace wall tube, and the other end of said rod being welded to the cross member.

4. An acoustic emission signal collector as recited in claim 2, wherein said plurality of waveguides include a curved portion on each side of said waveguide with said curved portions tapering in one direction and expanding in the other to define a radius of curvature on both sides, said tapered portion of each waveguide being attached to one furnace wall tube, and the expanded portion of each waveguide being connected to said cross member.

5. An acoustic emission signal collector as recited in claim 4, wherein the radius of curvature of one waveguide contacts the radius of curvature of another waveguide.

6. An acoustic emission sensor for simultaneously monitoring a plurality of furnace wall tubes for leaks, comprising:
   a plurality of waveguides attached to the furnace wall tubes;
   a cross member connected to said plurality of waveguides; and
   means for sensing a signal positioned on said cross member, said sensing means identifying a leak in the furnace wall tube from the signal propagating along the tube, the waveguide and to the cross member.

7. An acoustic emission sensor as recited in claim 6, wherein said plurality of waveguides include a plurality of rods with one end of each rod being welded to one furnace wall tube, and other end of said rod being welded to the cross member.

8. An acoustic emission sensor as recited in claim 6, wherein said plurality of waveguides include a curved portion on each side of said waveguide with said curved portions tapering in one direction and expanding in the other to define a radius of curvature on both sides, said tapered portion of each waveguide being attached to one furnace wall tube, and the expanded portion of each waveguide being connected to said cross member.

9. An acoustic emission sensor as recited in claim 8, wherein the radius of curvature of one waveguide contacts the radius of curvature of another waveguide.

10. An acoustic emission sensor as recited in claim 6, wherein said plurality of waveguides comprise a plurality of tines connected together by said cross member with each of said tines being bent at an angle and attached to the furnace wall tube.

11. An acoustic emission signal collector as recited in claim 1, wherein the object to be tested includes a multiplicity of parallel tubes not connected by membrane bars, but which form a plane.

* * * * *